June 4, 1940.   J. MUTTRAY ET AL   2,203,174
VEHICLE WINDOW
Filed Dec. 15, 1937
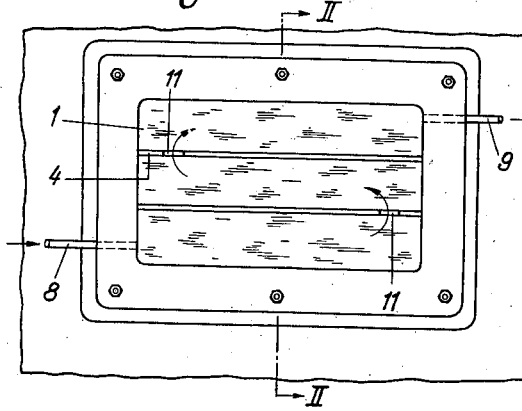
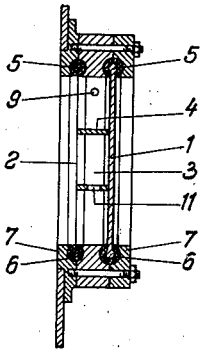
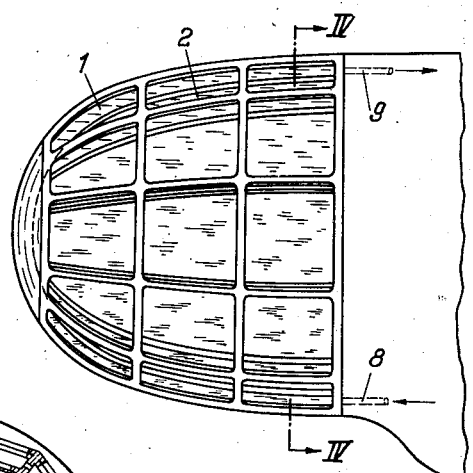
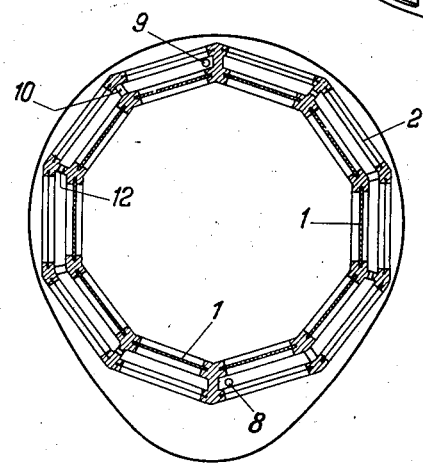
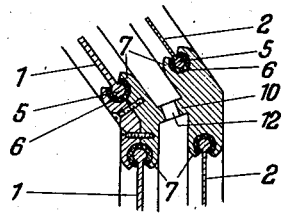
Inventors
Justus Muttray & Wilfried Vogel
by Michaelis & Michaelis
Attys.

Patented June 4, 1940

2,203,174

UNITED STATES PATENT OFFICE 2,203,174

VEHICLE WINDOW

Justus Muttray and Wilfried Vogel, Dessau, Germany, assignors to Junkers Flugzeug-und-Motorenwerke Aktiengesellschaft, Dessau, Germany Application December 15, 1937, Serial No. 179,876
In Germany December 28, 1936

4 Claims. (Cl. 20—40.5)

Our invention relates to windows and more especially to the windows of vehicles and aircraft. It is an object of our invention to provide means whereby the formation of an ice layer on the outer pane of double windows can be efficiently prevented.

In order to prevent the obstruction of sight brought about by the formation of ice on a window pane it has already been suggested to use, in connection with motor vehicles, double windows and to pass hot air through the space enclosed between the outer and inner panes. In such arrangement the outer pane was made sufficiently thick-walled to be able to take up the forces acting thereon from without and in consequence of the relative thickness of this pane a relatively great amount of heat energy was required to keep the outer surface of the outer pane even moderately warm, so that it was not possible to prevent the formation of ice on the outer surface under all circumstances.

According to the present invention this drawback is avoided by providing an inner pane, which is sufficiently thick-walled to be able to take up all mechanical stresses, while the outer pane is relatively thin-walled in proportion. We thereby obtain that the outer surface of the outer pane is heated up sufficiently with a small amount of heat energy, since owing to its thickness a better transmission of heat is secured.

We have found it particularly advantageous to use an outer pane consisting of a thin film of a transparent material adapted to resist tensional strain, which is rigidly fixed in spaced relationship to the inner pane at a substantially permanently fixed distance therefrom, i. e. is deformable at most within the limits of its elasticity without being capable of any farther reaching, predetermined deformation. The heating medium flowing through the interstice between the outer and inner panes is then acted upon by a pressure which is substantially equal to the pressure acting on the outer surface of the outer pane. The heating medium thus serves for taking up the forces acting from without on the outer pane, so that this pane is greatly relieved of any loads acting thereon and can therefore be made particularly thin and therefore also highly heat conductive. In order to further relieve the outer pane, we prefer to connect it with preferably transparent stays, which are preferably supported by the inner pane and hold the outer pane uniformly spaced from the inner pane in order to prevent fluttering of the outer pane. This arrangement is particularly useful in the case where the window is connected with a vehicle. If it forms part of an aircraft, the stays preferably extend in planes extending in the direction of travel so that any corrugations formed in consequence of the yielding nature of the outer pane extend in a direction such that the formation of whirls in the air flowing past the window is avoided.

In the drawing affixed to this specification and forming part thereof two windows embodying our invention are illustrated diagrammatically by way of example.

In the drawing

Fig. 1 is a double window which is arranged in the space delimited by the outer wall of a high-altitude cabin of an aircraft, Fig. 2 being a cross section on the line II—II in Fig. 1.

Fig. 3 shows a plurality of double-walled windows arranged on the cockpit of an aircraft, Fig. 4 being a cross section on the line IV—IV in Fig. 3, while Fig. 5 shows a part of Fig. 4 drawn to a larger scale.

Referring to the drawing and first to Figs. 1 and 2, I is the inner pane, 2 the outer pane. The inner pane is sufficiently thick-walled to take up the stresses and more particularly those acting on the pane in consequence of the increased pressure prevailing in the cabin. In contradistinction thereto the outer pane 2 is thin-walled similar to a film and consists of a material resistive against tensional forces. The space 3 enclosed between the two panes is traversed by a gaseous heating medium acted on by a pressure which is substantially equal to the pressure prevailing on the outside of the pane 2, so that this pane is relieved of all strains in a far reaching manner.

In the modification illustrated in Figs. 3 to 5 the inner panes I are also thick-walled, while the outer panes 2 are thin-walled, being made of a material resistive against tensional forces.

Owing to the thinness of the outer pane 2 the resistance it opposes to the transmission of heat from its inner to its outer surface is low. Even with great differences between the temperatures of the space enclosed between the panes and the outer air the outer pane thus undergoes only a comparatively small drop of temperature and therefore the temperature of the outer pane can easily be kept above freezing point even at low temperatures, so that the formation of ice on the outer pane is avoided. Moreover owing to the outer pane being kept warm by the heating medium, the properties of the material remain almost unchanged even if the outer temperature varies within wide limits. Apart therefrom, the weight of these panes is very low.

In order to prevent the outer panes 2 from moving (fluttering) under the influence of the travelling wind, these panes are connected with stays 4 (Fig. 2) secured to the inner pane 1. These stays 4 are located in planes extending in the direction of flight and consequently also such corrugations which may form owing to the yielding nature of the outer panes 2 will extend in the same direction.

In the modification illustrated in Figs. 3 to 5 no such stays are provided, since the individual panes are comparatively small.

As shown in Figs. 2 and 5 the outer and inner panes are mounted in place in such manner that the edges of the panes 1 and 2 are formed with bulged portions 5, which are held in settings 7 formed on the frames, a yielding layer 6 being inserted between the bulging edges of the panes and their seats in the frame.

The gaseous heating medium is supplied to and exhausted from the interstice 3 by means of pipes 8 and 9, respectively, means such as perforations 11 and 12 being provided in the stays 4 (Figs. 1 and 2) and in the stays 10 (Figs. 3 and 4), respectively, which are arranged in staggered relation, whereby the panes 1 and 2 are uniformly contacted all over their surface by the heating medium.

Various changes may be made in the details disclosed in the foregoing specification without departing from the invention or sacrificing the advantages thereof.

We claim:

1. In an aircraft, a double-walled defrosting window subject to excessive wind pressure from outside and comprising a relatively thick inner pane, a relatively thin but substantially rigid outer pane in spaced relation thereto, means substantially sealing the space between said panes, and controllable means for building up within said space a variable temperature and uniform pressure adapted to simultaneously inhibit the formation of frost on the outside of the outer pane and substantially counterbalance excess pressure exerted thereon from without.

2. In an aircraft, a double-walled defrosting window subject to excessive wind pressure from outside and comprising a relatively thick inner pane, a relatively thin but substantially rigid outer pane in spaced relation thereto, means substantially sealing the space between said panes, and means for introducing into the space a heated gaseous medium under uniform pressure sufficient to counterbalance the excess air pressure exerted on the outside of the outer pane to thereby prevent flexing of the same to the point of breakage.

3. In an aircraft, a double-walled defrosting window subject to excessive wind pressure from outside and comprising a relatively thick inner pane, a relatively thin but substantially rigid outer pane in spaced relation thereto, means substantially sealing the space between said panes, and means for introducing into the space a heated gaseous medium under uniform pressure sufficient to counterbalance the excess air pressure exerted on the outside of the outer pane to thereby prevent flexing of the same to the point of breakage, said means including inlet and outlet conduits into the space between the panes.

4. That method of preventing the formation of frost on the outer surface of an aircraft window subject to excessive wind pressure from the outside which consists in forming the outer pane of a sealed double-walled window of relatively thin but substantially rigid transparent substance capable of rapidly absorbing heat and introducing into the space between the inner and outer panes a heated gaseous substance under uniform pressure sufficient to counterbalance the excess air pressure exerted on the outside of the outer pane to thereby prevent flexing of the latter to the point of breakage.

JUSTUS MUTTRAY.
WILFRIED VOGEL.